UNITED STATES PATENT OFFICE.

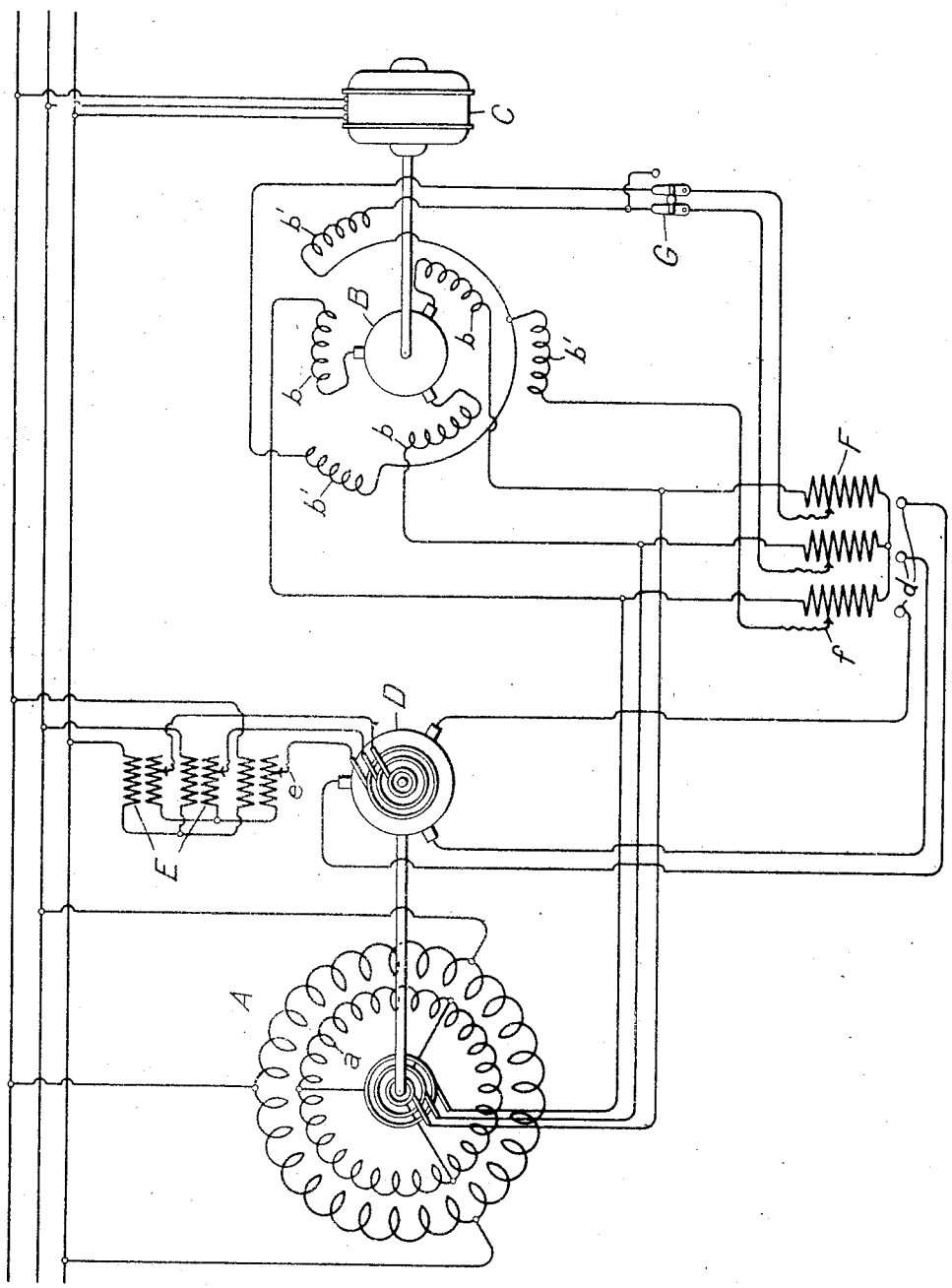

MAURICE MILCH, OF BUDAPEST, AUSTRIA-HUNGARY, ASSIGNOR TO GENERAL ELECTRIC COMPANY, A CORPORATION OF NEW YORK.

INDUCTION-MOTOR CONTROL.

1,085,151.  Specification of Letters Patent.  Patented Jan. 27, 1914.

Application filed September 12, 1911. Serial No. 648,985.

*To all whom it may concern:*

Be it known that I, MAURICE MILCH, a subject of the King of Hungary, residing at Budapest, Austria-Hungary, have invented certain new and useful Improvements in Induction-Motor Control, of which the following is a specification.

My invention relates to the control of induction motors and consists in an improvement in the arrangement disclosed in my British Patent #22,863, of 1906. In that patent I described an arrangement for controlling the speed of an induction motor, comprising an alternating current commutator machine, having its armature circuit connected to the secondary winding of the induction motor, and a frequency changer serving as an exciter for the commutator machine. The frequency changer was driven at the proper speed, as by direct connection to the induction motor, so as to excite the commutator machine with a frequency corresponding at all times to the slip of the induction motor, so that the commutator machine introduced into the secondary circuit of the induction motor an electromotive force of the same frequency as that induced in the secondary winding by the primary of the induction motor. By varying the voltage impressed on the exciting winding of the commutator machine by the frequency changer the amount of the voltage introduced into the secondary winding of the induction motor was controlled so as to control the speed of the induction motor, both below and above synchronism.

The object of my present invention is to reduce the size of the frequency changer required in the arrangement briefly described above and described at length in my British patent above referred to. The amount of excitation required for the commutating machine varies almost with the square of the slip of the induction motor, so that a frequency converter for exciting the commutator machine, if required to excite it through a range of say one quarter of the maximum slip to be obtained, would have to supply only about 1/16 of the energy that would be required if the frequency changer were to supply the exciting energy for the commutator machine throughout the whole range of slip. Therefore, according to my present invention, in order to reduce the size of the frequency changer, instead of supplying the excitation of the commutator machine throughout the whole range of regulation from the frequency changer alone, I propose to operate the commutator machine as a self-excited machine over the greater part of the range of speed, and to excite it from the frequency changer only when the speed of the induction motor is near synchronism, at which times the commutator machine could not operate as a self-excited machine because of the absence of voltage in its armature circuit; that is, in the secondary circuit of the induction motor.

My invention will best be understood by reference to the accompanying drawing, which shows diagrammatically an induction motor and speed controlling means therefor, arranged in accordance with my invention.

In the drawing A represents the primary winding of the main induction motor, the speed of which is to be regulated. $a$ represents the secondary or rotor winding, which has its terminals connected to suitable collector rings. Both primary and secondary are shown as three-phase.

B represents the armature of an alternating current commutator machine. This armature is connected to the collector rings of the secondary winding $a$ of the induction motor, and therefore is arranged three-phase like the secondary winding.

$b$ represents the compensating winding of the commutator machine, which is in series with the armature B.

$b'$ represents the exciting winding of the commutator machine.

C represents the driving means for the commutator machine, which is represented as an induction motor connected to the supply circuit in parallel with the main motor. The commutator machine is preferably driven by a separate motor rather than by connection to the main motor because by driving it separately it is possible to operate it at a higher speed and consequently to reduce its size and cost.

D represents the frequency changer which serves as an exciter for the alternating current generator over a portion of the range of operation. This frequency changer is driven at a speed corresponding to that of the main motor, and may be mounted on the shaft of the main motor as shown. This frequency changer comprises a winding having a three-phase arrangement of both collector rings and commutator brushes, the collector rings being connected to the supply circuit through suitable transformers E, and the commutator brushes serving to deliver to the alternating current commutator machine exciting current at a frequency corresponding to that in the secondary winding of the main induction motor.

F represents a transformer connected in shunt to the armature circuit of the alternating current commutator machine. This transformer is represented as a three-phase auto-transformer, connections to its winding being made from the exciting winding $b'$ by means of movable contacts $f$. When these contacts are in engagement with the transformer winding as shown, the alternating current commutator machine is connected as a self-excited or shunt machine. When the contacts $f$ are moved from the transformer winding into engagement with the contacts $d$ connected to the commutator brushes of the frequency changer D, the commutator machine is excited from the frequency changer.

In operation, when the speed of the main induction motor is at its minimum; that is, when the slip below synchronism is at its maximum, the alternating current commutator machine is connected as a self-exciting machine with the contacts $f$ in position to impress the maximum voltage from the transformer F on the exciting winding $b'$. To raise the speed of the main motor these contacts are moved downward as viewed in the diagram, so as to reduce the excitation of the commutator machine, and consequently the counter-electromotive force introduced by this machine into the secondary winding of the induction motor. The speed of the main induction motor is thus gradually raised until the slip has fallen to a certain amount. The contacts $f$ are then moved into engagement with the contacts $d$ so as to excite the commutator machine from the frequency changer. The excitation of the commutator machine may be further reduced and the speed of the main induction motor correspondingly raised by reducing the voltage supplied to the exciting winding $b'$ from the frequency changer. This voltage may conveniently be controlled by moving the contacts $e$, which vary the ratio of transformation of the transformers E supplying the frequency changer. When the speed of the main induction motor has risen very nearly to synchronism, the reversing switch G in circuit with the exciting winding $b'$ is thrown so as to reverse the excitation of the commutator machine. The voltage of the frequency changer is then gradually increased to bring the speed of the main motor to and above synchronism. When the excitation of the commutator machine has been increased up to the capacity of the frequency changer, contacts $f$ are moved from contacts $d$ to transformer winding F so as to make the commutator machine again self-exciting. The excitation of winding $b'$ may now be further increased and the speed of the main induction motor further raised above synchronism up to the maximum speed for which the regulating system is designed.

While I have shown a three-phase arrangement, my invention is not limited to any particular number of phases, nor do I desire to limit myself to the particular construction and arrangement of parts shown and described, but aim in appended claims to cover all modifications which are within the scope of my invention.

What I claim as new and desire to secure by Letters Patent of the United States, is:

1. In combination, an induction motor, an alternating current commutator machine having its armature circuit connected to the secondary of the induction motor, a driving motor therefor, a frequency changer driven by said induction motor, a transformer connected to the armature circuit of said commutator machine, means for connecting the exciting winding of said commutator machine alternately to the transformer or to the frequency changer, means for controlling the strength of excitation of said commutator machine, and means for reversing the electromotive force at the terminals of said machine.

2. In combination, an induction motor, an alternating current commutator machine having its armature circuit connected to the secondary of the induction motor, a driving motor therefor, a frequency changer driven by said induction motor, a transformer connected to the armature circuit of said commutator machine, means for connecting the exciting winding of said commutator machine alternately to the transformer or to the frequency changer, means for varying the ratio of transformation of said transformer, means for varying the voltage delivered by the frequency changer to the exciting winding, and means for reversing the terminals of said exciting winding.

In witness whereof, I have hereunto set my hand this 28th day of August, 1911.

MAURICE MILCH.

Witnesses:
CHARLES C. BUOY,
P. DE FRAUNIER.